United States Patent
Diep et al.

(10) Patent No.: US 10,681,050 B2
(45) Date of Patent: *Jun. 9, 2020

(54) EPHEMERAL APPLICATIONS

(71) Applicant: GOOGLE LLC, Mountain View, CA (US)

(72) Inventors: Thanh-Mai Diep, Sydney (AU); Ben Frederick Wells, Cherrybrook (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,122

(22) Filed: Aug. 29, 2018

(65) Prior Publication Data

US 2018/0375872 A1 Dec. 27, 2018

Related U.S. Application Data

(63) Continuation of application No. 14/939,627, filed on Nov. 12, 2015, now Pat. No. 10,069,832.

(Continued)

(51) Int. Cl.
*H04L 29/06* (2006.01)
*G06F 21/51* (2013.01)
(Continued)

(52) U.S. Cl.
CPC .......... *H04L 63/10* (2013.01); *G06F 9/44526* (2013.01); *G06F 21/121* (2013.01);
(Continued)

(58) Field of Classification Search
CPC ......... H04L 63/10; H04L 67/18; H04L 67/34; H04W 4/02; G06F 21/121; G06F 21/51; G06F 2221/2141

See application file for complete search history.

(56) References Cited

U.S. PATENT DOCUMENTS 6,526,513 B1 2/2003 Shrader et al.
8,370,950 B2 * 2/2013 Ramsinghani .......... G06F 21/51
713/176

(Continued)

FOREIGN PATENT DOCUMENTS

CN 1556959 A 12/2004
CN 103870336 A 6/2014
WO 2013/184799 A1 12/2013

OTHER PUBLICATIONS

International Search Report and Written Opinion received for PCT Application No. PCT/US2015/060644, dated Feb. 12, 2016, 11 pages.

(Continued)

*Primary Examiner* — Linglan E Edwards
(74) *Attorney, Agent, or Firm* — Brake Hughes Bellermann LLP

(57) ABSTRACT

A method of executing an application in a direct launch mode includes receiving a user input to download an application from a remote server to a client computing device and to launch the application on the client computing device. Permissions requested by the application to utilize local resources of the client computing device during execution of the application by the client computing device are determined, and the determined permissions are compared to a list of predetermined permissions requiring modification of the execution of the application when the application is executed in a direct launch mode. The application is launched without additional input from the user, and the application is executed on the client computing device with at least one of the requested permissions not being granted in its entirety.

20 Claims, 6 Drawing Sheets

Related U.S. Application Data

(60) Provisional application No. 62/080,009, filed on Nov. 14, 2014.

(51) Int. Cl.
    *G06F 9/445*     (2018.01)
    *G06F 21/12*     (2013.01)
    *H04L 29/08*     (2006.01)
    *H04W 4/00*     (2018.01)

(52) U.S. Cl.
CPC .......... *G06F 21/51* (2013.01); *H04L 67/1002* (2013.01); *H04L 67/18* (2013.01); *H04L 67/42* (2013.01); *G06F 2221/2119* (2013.01); *G06F 2221/2141* (2013.01); *H04L 67/34* (2013.01); *H04W 4/00* (2013.01)

(56) References Cited

U.S. PATENT DOCUMENTS

| | | | | |
|---|---|---|---|---|
| 8,844,032 B2* | 9/2014 | Saidi | ................... | G06F 21/6218 726/22 |
| 8,844,036 B2* | 9/2014 | Saidi | ................... | G06F 21/6218 726/23 |
| 9,886,595 B2* | 2/2018 | Kwag | ................... | G06F 21/629 |
| 2003/0051169 A1* | 3/2003 | Sprigg | ................... | G06F 9/468 726/4 |
| 2011/0289537 A1 | 11/2011 | Buehl | | |
| 2013/0055378 A1 | 2/2013 | Chang et al. | | |
| 2013/0247030 A1 | 9/2013 | Kay et al. | | |
| 2014/0165216 A1 | 6/2014 | Kwag et al. | | |
| 2014/0366143 A1 | 12/2014 | Sandler | | |
| 2015/0081764 A1* | 3/2015 | Zhao | ....................... | H04L 67/08 709/203 |
| 2015/0356283 A1* | 12/2015 | Kress | ....................... | G06F 21/53 726/17 |

OTHER PUBLICATIONS

International Preliminary Report on Patentability received for PCT Application No. PCT/US2015/060644, dated May 26, 2017, 9 pages.

First Office Action with English translation for Chinese Application No. 201580034681.6, dated Mar. 19, 2019, 19 pages.

* cited by examiner

EPHEMERAL APPLICATIONS

CROSS REFERENCE TO RELATED APPLICATION

This application is a continuation of, and claims priority to, U.S. patent application Ser. No. 14/939,627, filed on Nov. 12, 2015, titled "EPHEMERAL APPLICATIONS," which claims priority under 35 U.S.C. § 119 to, U.S. Provisional Patent Application Ser. No. 62/080,009, filed Nov. 14, 2014, titled, "EPHEMERAL APPLICATIONS", the disclosures of which are incorporated herein in their entireties.

TECHNICAL FIELD

Embodiments relate to applications, in particular, to ephemeral applications, that are executed within the context of a browser.

BACKGROUND

Generally, applications are either hosted by a network or remote server or installed on a client computing device. Hosted applications have the advantage of being flexible in that a change to the application can affect all users of the application. However, hosted applications are typically not considered secure because of the nature of the Internet. Installed applications have the advantage of being secure in that they are typically standalone (e.g., disconnected) from the Internet. However, installed applications are not flexible, in that a change to the application typically requires a new installation of the application.

SUMMARY

Accordingly, in the below description example embodiments disclose techniques for providing ephemeral applications that may have characteristics of packaged applications, in that code for ephemeral application is downloaded to a client computing device and installed for execution. Ephemeral applications require no review and granting of permissions by the user because the ephemeral application is launched instantly, without review and explicit granting of permissions by a user, but ephemeral application can utilize local resources of the client computing device that are accessible only when a permission is granted. In some implementations, this is accomplished by managing the permissions utilized by an ephemeral application, such that an ephemeral application only utilizes permissions, or versions of permissions, that are deemed to be safe for use without user review.

In a first general aspect, a method of executing an application in a direct launch mode includes receiving a user input to download an application from a remote server to a client computing device and to launch the application on the client computing device. Permissions requested by the application to utilize local resources of the client computing device during execution of the application by the client computing device are determined, and the determined permissions are compared to a list of predetermined permissions requiring modification of the execution of the application when the application is executed in a direct launch mode. The application is launched without additional input from the user, and the application is executed on the client computing device with at least one of the requested permissions not being granted in its entirety.

In a another general aspect, a system for executing an application in a direct launch mode includes memory storing executable instructions and one or more processors coupled to the memory and configured to execute the instructions to cause the system to receive a user input to download an application from a remote server to a client computing device and to launch the application on the client computing device. The one or more processors are further configured to execute the instructions to cause the system to determine permissions requested by the application to utilize local resources of the client computing device during execution of the application by the client computing device are, and to compare the determined permissions to a list of predetermined permissions requiring modification of the execution of the application when the application is executed in a direct launch mode. The one or more processors are further configured to execute the instructions to cause the system to launch the application without additional input from the user, and to execute the application on the client computing device with at least one of the requested permissions not being granted in its entirety.

In another general aspect, a system of executing an application in a direct launch mode includes a means for receiving a user input to download an application from a remote server to a client computing device and to launch the application on the client computing device, a means for receiving a user input to download an application from a remote server to a client computing device and to launch the application on the client computing device, a means for determining permissions requested by the application to utilize local resources of the client computing device during execution of the application by the client computing device, a means for comparing the determined permissions to a list of predetermined permissions requiring modification of the execution of the application when the application is executed in a direct launch mode, a means for launching the application without additional input from the user, and a means executing the application on the client computing device with at least one of the requested permissions not being granted in its entirety.

Implementations of the above aspects can include one or more of the following features, alone or in combination. For example, executing the application with one of the requested permissions not being granted in its entirety can include modifying a runtime environment of the application, such that when the application is executed on the client computing device, the least one of the requested permissions is not granted in its entirety. The application can be coded only with one or more web-technology programming languages, and the application can be executable on the client computing device without compilation. The application can contain all of the resources necessary to execute the application on the client computing device and code needed to execute the application by the client computing device is not dynamically generated. The at least one of the requested permissions not being granted in its entirety can include a permission to access unlimited storage space on the client computing device and execution of the application can include executing the application on the client computing device while granting access to a predetermined maximum amount of storage space on the client computing device. The at least one of the requested permissions not being granted in its entirety can include a permission to access information about a location of the client computing device and execution of the application can include executing the application on the client computing device while informing the application that location information with GPS-level accuracy is unavailable, even when a GPS transceiver of the client computing device is active.

In another general aspect, a method of executing an application in a direct launch mode includes receiving a user input to download an application from a remote server to a client computing device and to launch the application on the client computing device. Permissions requested by the application to utilize local resources of the client computing device during execution of the application by the client computing device are determined, and the determined permissions are compared to a list of predetermined permissions requiring authorization by a user. The application is launched without additional input from the user, and, after launching the application, while the application is executing, the user is prompted to authorize one of the determined permissions.

In another general aspect, a system for executing an application in a direct launch mode includes memory storing executable instructions and one or more processors coupled to the memory and configured to execute the instructions to cause the system to receive a user input to download an application from a remote server to a client computing device and to launch the application on the client computing device. The one or more processors are further configured to execute the instructions to cause the system to determine permissions requested by the application to utilize local resources of the client computing device during execution of the application by the client computing device and to compare the determined permissions to a list of predetermined permissions requiring authorization by a user. The one or more processors are further configured to execute the instructions to cause the system to launch the application without additional input from the user, and, after launching the application, while the application is executing, to prompt the to authorize one of the determined permissions.

In another general aspect, a system of executing an application in a direct launch mode includes a means for receiving a user input to download an application from a remote server to a client computing device and to launch the application on the client computing device, a means for determining permissions requested by the application to utilize local resources of the client computing device during execution of the application by the client computing device, a means for comparing the determined permissions to a list of predetermined permissions requiring authorization by a user, a means for launching the application without additional input from the user, and a means for prompting the user, after launching the application and while the application is executing, to authorize one of the determined permissions.

Implementations of the above aspects can include one or more of the following features, alone or in combination. For example, the prompting can occur at a time during the execution when the application needs to utilize the local resources permitted by the permission in order to continue executing. The determined permission the user is prompted to authorize can be a permission to access information about a location of the client computing device with GPS-level accuracy. The determined permission the user is prompted to authorize can be a permission to access unlimited storage space on the client computing device. The determined permission the user is prompted to authorize can be a permission to capture audio information from a microphone of the client computing device. The application can be coded only with one or more web-technology programming languages, and wherein the application is executable on the client computing device without compilation. The application can contain all of the resources necessary to execute the application on the client computing device and code needed to execute the application by the client computing device is not dynamically generated.

Systems and methods described here include an application environment that exhibits one or more advantages of hosted and installed applications.

DETAILED DESCRIPTION OF THE EMBODIMENTS

Figure 1:
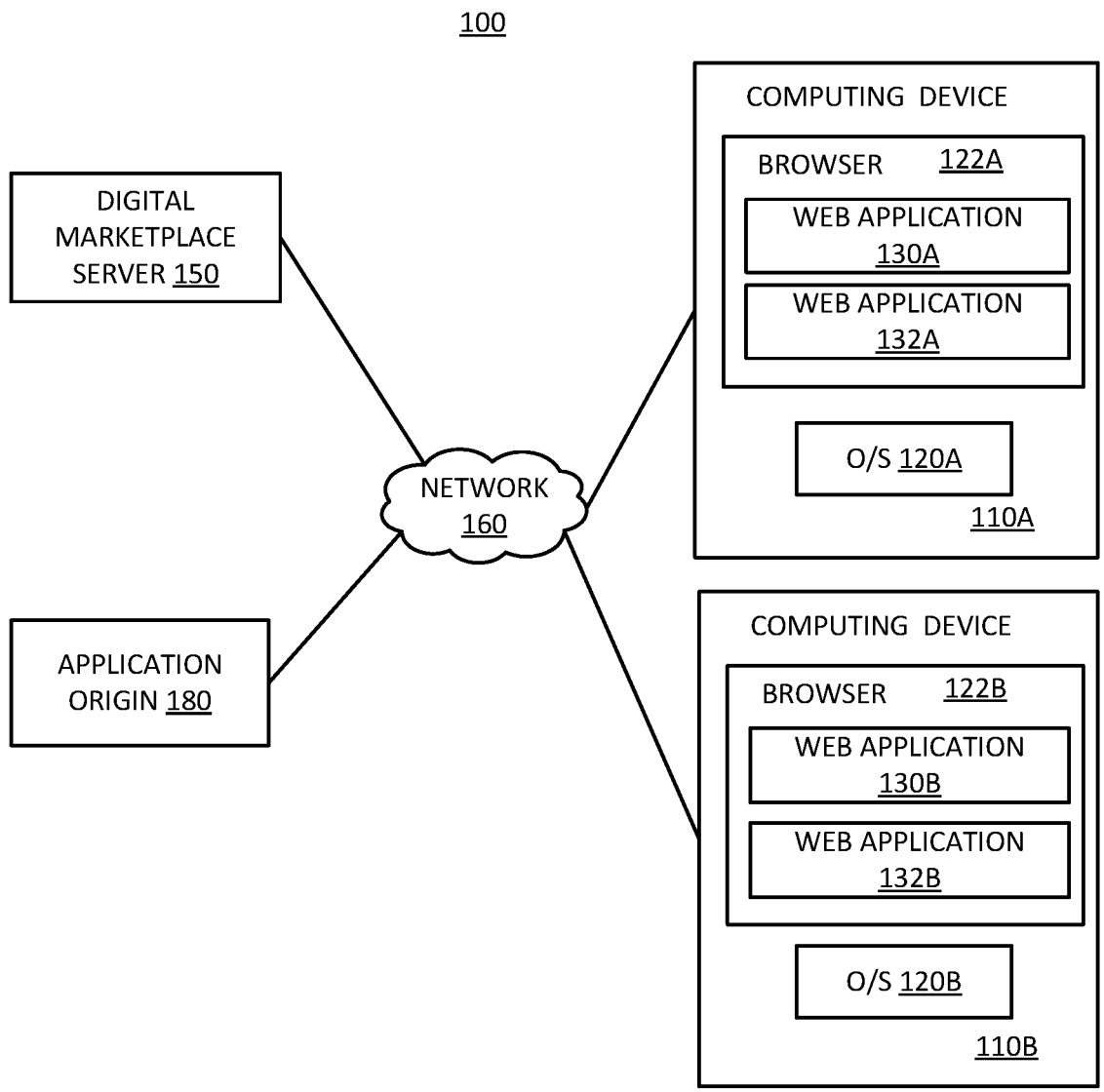
FIG. 1 is a block diagram of a system that may be used to implement ephemeral applications using the techniques described herein.

A web browser executed by a client device can receive code (e.g., web-technology programming code) from a remote server (e.g., a remote server that hosts a website) and can execute the received code on the client device for the benefit of a user of the client device.

In various implementations, the web browser may include or have installed one or more applications that may be configured to perform a single task or multiple tasks for a user. In such an implementation, the application may be configured to be executed or interpreted by the web browser. In general, a browser-executable application is a program that is written in web-technology programming code, i.e., code that is used for programming Internet-available resources and that is executable on the client computing device without compilation. Web-technology programming code is designed to be run entirely within a web browser on the client computing device and includes, for example, markup language code (e.g., HTML5), JavaScript, and CSS. The browser-executable application contains all of the resources necessary to execute the application on the client computing device and the code needed to execute the application by the client computing device is not dynamically generated.

Thus, browser-executable applications can be run inside a web browser with a dedicated user interface, and may provide functionality and an experience that is more rich and interactive than a standalone website, although the applications may be less cumbersome and monolithic than a desktop application. Examples of web applications include games, photo editors, and video players that are executed by the browser.

Web applications can include "hosted web applications," or "packaged applications." Hosted web applications can be granted, additional permissions to use local resources of a client computing device, beyond what typical code executed by a browser is permitted to use (e.g., the ability to read content from a local clipboard or the ability to always have a hidden page open which is performing tasks such as synchronizing data for offline use or receiving server-pushed notifications to display to the user). In some implementations, notice of the additional permissions must be provided to the user and the user must explicitly grant the permissions, so that the user is aware of the additional permissions and may determine whether they should be granted in exchange for running the hosted app. Launching the hosted application implicitly grants the permissions requested by the application for all pages whose URLs match those that are listed in the manifest for the application, where the manifest is a file that may contain metadata associated with the web application or extension application. The manifest may include one or more fields that specify information related to the application, including a permissions field. In the permissions field, a developer specifies the declared permissions that may be used by the application. The manifest file is associated with the application and is part of the instructions that are provided to the client computing device with the application. Once the permissions requested by the application are granted, the application is able to use the features that are enabled by the granted permissions without having to repeatedly ask the user for permission to use the features. Hosted web applications also get special treatment in a user interface, in that hosted web applications may be shown with a large icon that can be clicked to launch the application either in a tab or in a standalone (possibly full screen) window.

Packaged applications can be thought of as web applications whose code is bundled, so that the user can download all of the content of the web application for execution by the browser or in a standalone window. A packaged application may not need to have network access to perform its functionality for the user, and rather may be executed successfully by the browser locally on the computing device without access to a network.

Packaged applications have the option of using extension application programming interfaces (APIs), allowing packaged apps to change the way the browser behaves or looks. In some cases, a packaged application may operate without appearing to run in a browser, e.g., without the browser "chrome" (i.e., UI elements around the webpage or app content displayed in the browser window), tabs, or other user interface of the browser. In such a case, the packaged application could operate in a standalone window without access to content scripts or APIs related to browser state such as cookies, history, bookmarks, open tabs, etc. In various cases, packaged applications may access USB drives, BLUETOOTH devices, open raw network sockets, act as servers, or access the local filesystem, as examples.

Packaged applications may look and feel like native applications, with a big-screen design and rich user interface. Packaged applications may bundle all their files into a single file (e.g., a zip file, such as a .CRX file) that a user downloads and then installs the content of. This bundling means that, unlike hosted applications, packaged applications do not need to depend on content from the web. Applications may be distributed via a trusted web store, or via individual websites, as examples.

In some implementations, the API (and/or web API)) may be an element of a web browser as discussed above. However, in some implementations, the API (and/or web API)) may be an element of a web based operating system (Browser-OS). A Browser-OS may be a bootable version of a web browser (including a browser, a media player and a file system). The Browser-OS may store all of a user applications and data on the Web, as opposed to a local hard drive. The Browser-OS (e.g., Chrome-OS®) may replace a traditional operating system.

A web browser and/or a Browser-OS may include an associated runtime. A runtime (also called a runtime system or a runtime environment) can implement some behavior (e.g., low-level (e.g., core) and/or high-level (e.g., type checking, garbage collection and/or debugging)) of a computer language (e.g., HTML and/or JAVASCRIPT) or program (e.g., a web browser). Any computer language can implement some form of runtime, whether the language is a compiled language, interpreted language, embedded domain-specific language, or is invoked via an API. In some implementations, the runtime can retrieve a background page, return details about a manifest, and listen for and respond to events in the app lifecycle. The runtime can convert the relative path of a URL to a fully-qualified URL. In some implementations, the runtime can manage the app lifecycle. The app runtime manages app installation, controls the event page, and can shut down the app at anytime.

Like hosted applications, packaged apps also can be granted, additional permissions to use local resources of a client computing device, beyond what typical code executed by a browser is permitted to use. In some implementations, packaged apps may be granted additional permissions that provide more access to local resources of a client computing device than a hosted application is permitted to use. With a packaged application, a user may be comfortable with downloading and installing the application and giving the packaged application a high level of access to the computing device because the packaged application has gone through a verification and validation process before the packaged application listed in a digital marketplace and the app is trusted not to change after it is downloaded and installed on the client computing devive. Therefore, the user trusts that the downloaded code will not be malicious, even though the code has been given a high level of access to the computing device.

By contrast, a hosted web application, even if the application has been approved in the digital marketplace, is essentially nothing more than a URL to a website plus some metadata that defines some permissions. Because the code at the website pointed to by the URL can change, users should be reluctant to grant a high level of access to the computing device to a hosted web application because the code may become malicious even if the code had been previously approved.

Both packaged applications and hosted web applications contemplate the use of permissions to allow increased use of local resources when running the application. However, users are willing to allow packaged applications to use more dangerous permissions (e.g., permissions having a high level of access to the computing device) because of the code of the packaged applications is validated and static. In other words, the code of the packaged application will not change after the code is downloaded and installed on the users machine. Nevertheless, because packaged applications can utilize more dangerous permissions than hosted applications, many of the permissions that can be requested by packaged applications must be explicitly granted by a user before the packaged app can be installed and executed on the client computing device. Thus, the life cycle of a packaged application is that the app is downloaded, permissions are requested and granted, the app is installed, and then the app is launched and executed.

Example implementations described herein relate to a new type of application that may be known as an "ephemeral application" and that may have characteristics of packaged applications, in that code for ephemeral application is downloaded to a client computing device and installed for execution, but that require no review and granting of permissions by the user because the ephemeral application is launched instantly, without review and explicit granting of permissions by a user, even though the ephemeral application can utilize local resources of the client computing device that are accessible only when a permission is granted. In some implementations, this is accomplished by managing the permissions utilized by an ephemeral application, such that an ephemeral application only utilizes permissions, or versions of permissions, that are deemed to be safe for use without user review. Because ephemeral applications do not need to request the granting of permissions, they can be launched quickly and efficiently. For example, an ephemeral application that use particular permissions to utilize local resources of a client computing device can be downloaded, installed, and launched, with at least some of its permissions being allowed, in response to a single user input.

Thus, an ephemeral application can exhibit the benefits of both of the above described hosted web application, in that the ephemeral application can be quick to launch, and packaged applications, in that the ephemeral application can be installed locally for offline use and can have higher-power permissions than a hosted application.

FIG. 1 is a block diagram of a system 100 that may be used to implement ephemeral applications using the techniques described herein. The depiction of system 100 in FIG. 1 is shown by way of example. It will be appreciated that other network configurations may be used for implementing such techniques.

The system 100 includes client computing devices 110A and 110B. The client computing devices 110A and 110B may take the form of a number of different devices, such as a personal computer, a television, laptop computer, tablet computer, netbook computer, a wearable device, or a web-enabled phone, as examples. The devices 110A and 110B each include an operating system 120A and 120B and a browser 122A and 122B that may be used to access various types of content. Such content may include web sites, photos, video, audio and executable scripts, for example. As shown in FIG. 1, browser 122A can include ephemeral application 130A, which may be executed on the computing device 110A using the techniques described herein. The ephemeral application 130A may include respective client-side components of the application. Depending on the particular implementation, the ephemeral application 130A may include a description of the application and/or code that is executable by the browser 122A, where that code provides functionality for the web application. Similarly, browser 122B can include ephemeral application 130B, which may be executed by the computing device 110B using the techniques described.

In the system 100, the computing devices 110A and 110B are coupled with a network 160. The network 160 may include a data access network that provides access to the Internet and/or the World Wide Web. Via the network 160, computing devices 110A and 110B (using browsers 122A and 122B, for example) may communicate with a digital marketplace server 150 (e.g., an application server or web store), an application origin 180. In this example, the application origin 180 may include server-side components for the applications 130A and 130B. The applications 130A and 130B may operate using multiple origins.

The ephemeral applications 130A and 130B can be downloaded from the digital marketplace server 150 or from the application origin 180 to the client computing device 110A or 110B. To indicate that the application 130A or 130B could be executed as an ephemeral application, information may be included in the manifest for the application indicating that the application should be run as an ephemeral application. For example, a flag indicating ephemeral application status may be set to TRUE in the manifest for the application. Then, based on the information in the manifest or other information indicating that the application could be run as an ephemeral application, when the application is executed on the client computing device 110A or 110B the application can be executed as an ephemeral application.

When the application 130A or 130B is executed on the client computing device 110A or 110B, the application may utilize one or more permissions specified by the application (e.g., the permissions specified by the application can be declared in the manifest for the application). For example, based on the permissions specified by the application, access may be granted to local computing resources of the computing devices 110A and 110B in order for the application to access content scripts or APIs related to browser and/or a high level of access to the computing device. When executed as an ephemeral application, the application 130A or 130B can utilize the one or more permissions specified by the application without needing explicit confirmation or granting of the permissions by a user. That is, when executed as an ephemeral application, the user only needs to indicate that the application should be launched and executed by the client computing device 110A or 110B and need not separately indicate that the permissions specified by the application are to be granted. As explained in more detail herein, when the application 130A or 130B is executed as an ephemeral application the permissions specified that the application are managed automatically by the browser 122A, 1222B or the operating system 120A, 120B.

In various implementations, permissions specified by an application 130A, 130B may grant access to, for example, USB drives, BLUETOOTH devices, local storage media, the local filesystem (e.g., not associated with storing pages or browser state such as cookies, history, bookmarks, open tabs), locally-stored contact data, locally-stored calendar data, locally-stored location information, and various system tools (e.g., a tool that prevents the device from entering a sleep state, a tool that provides information about whether the client computing device is syncing data and background, a tool that allows the application to kill the process of another running application, etc.).

The web applications 132A and 132B available from the application origin 180 may be static in that any computing device (e.g., via a web browser) accessing one of web applications 132A and 132B will receive a same web application object (e.g., web page). In other words, a static web application is not dynamic with regard to changes to individual objects that make up the web application. In other words, a static web application is changed by replacing (e.g., uploading for use) the entirety of the web application. A developer of a static web application cannot replace individual web application objects (e.g., a web page or a user interface or a script) without replacing the web application as a whole. Rather, if a developer wants to make a change to a static web application, the developer must submit the code for the proposed revised web application for revalidation and re-verification (e.g., by the digital marketplace server 150) before it can be made available at the trusted server. In other words, upon receiving a change (e.g., from the developer of the web application) to an object of the ephemeral application 132A and/or 132B, validating of assurance characteristics of the ephemeral application 132A and/or 132B, as a whole, is once again performed before the change to the object of the ephemeral application 132A and/or 132B is made accessible via the URL.

Accordingly, objects of the ephemeral application 132A and/or 132B cannot be replaced, redirected, switched, reordered, or recoded, and made accessible via the URL without the ephemeral application 132A and/or 132B, as a whole, first successfully being validated and/or revalidated. The web applications 132A and 132B may be static in that the web application contains all of the resources necessary to execute the application on the client computing device and the code needed to execute the application by the client computing device is not dynamically generated.

The objects that make up the applications 132A and 132B can be stored (or substantially stored) on networked or server side computing device 150, 180 (e.g., a server) and served to client computing devices 110A, 110B. In other words, a client device (e.g., computing devices 110A and/or 110B) request, via a browser and/or a runtime, the objects that make up the application from the server utilizing a URL as an example. The applications 132A and 132B may be hosted by a secure server, for example. Such hosting includes providing access to the application, and code associated with the application, to a web crawler.

In one implementation, the digital marketplace server 150 may be configured to receive requests from user computing devices (such as the computing device 110A) for installation of applications, and to provide, in response to such requests, installation procedures (or installation packages) for the applications. Such installation procedures/packages may include, at least, the client-side component for a requested application.

In the arrangement shown in FIG. 1, browser 122A may be used to request installation of the applications 130A, 130B by interacting with the digital marketplace server 150. For example, the digital marketplace 150 may implement a website that is used to distribute web applications, among other content. As an example, the digital marketplace server 150 may implement an e-commerce site. Digital marketplace server 150 may acquire applications from developers, for example, from application origin 180.

Requests to launch applications may be included in messages from the computing device 110A, 110B to the digital marketplace server 150 that indicate agreement to purchase respective web applications or launch applications that are provided free of cost. While system 100 illustrates only a single digital marketplace server 150, and an application origin 180, it will be appreciated that additional digital marketplaces, servers, or origins may be included in system 100.

In some implementations, the application origin 180 may also implement one or more websites that the computing devices 110A and 110B (e.g., using browsers 122A and 122B) may interact with to request installation of applications 130A, 130B, 132A and 132B. As an example, ephemeral application 130A may be a packaged application, which includes a manifest file that may include permissions (e.g., permissions to use local resources or do other things normal web-technology programming languages (e.g., HTML, XML code) is not permitted to do) and at least one file to provide a user interface, along with other files, such as image files. In some implementations, application origin 180 may be trusted because it includes a manual review management component, i.e., people review applications that are provided from the application origin 180 for security issues, bugs, etc. Further, application origin 180 may be trusted because it may be operated by the same company that develops browsers 122A and 122B, for example, as well as operating systems used to execute web applications and browser extensions. Application origin 180 may also be trusted because it may operate autonomous procedures by a processor of a computing device to validate web applications for security issues, authorship, bugs, etc. In contrast, other origins may be less trusted because they are not known to include the same levels of automated and/or manual review or other scrutiny as application origin 180, and because other origins may not provide trusted browsers or operating systems, for example. The trusted application origin 180 may be one of a select few web application origins with known addresses identifying the web application origin as trusted.

Browsers 122A and 122B may also provide feedback to application origin 180 about the local usage of a web application on the client computing device. By receiving such feedback from many client computing devices 110A and 110B, application origin 180 may gather information about how an application is actually used and about any security issues encountered after the application is accessed from the application origin 180, for example. Thus, application origin 180 may analyze web applications based on signals related to security issues, where such signals may include signals based on information about how applications actually perform after the web applications are accessed from the application origin 180 and executed by a client computing device. For example, users may report malware or bugs to the application origin 180.

Figure 2:
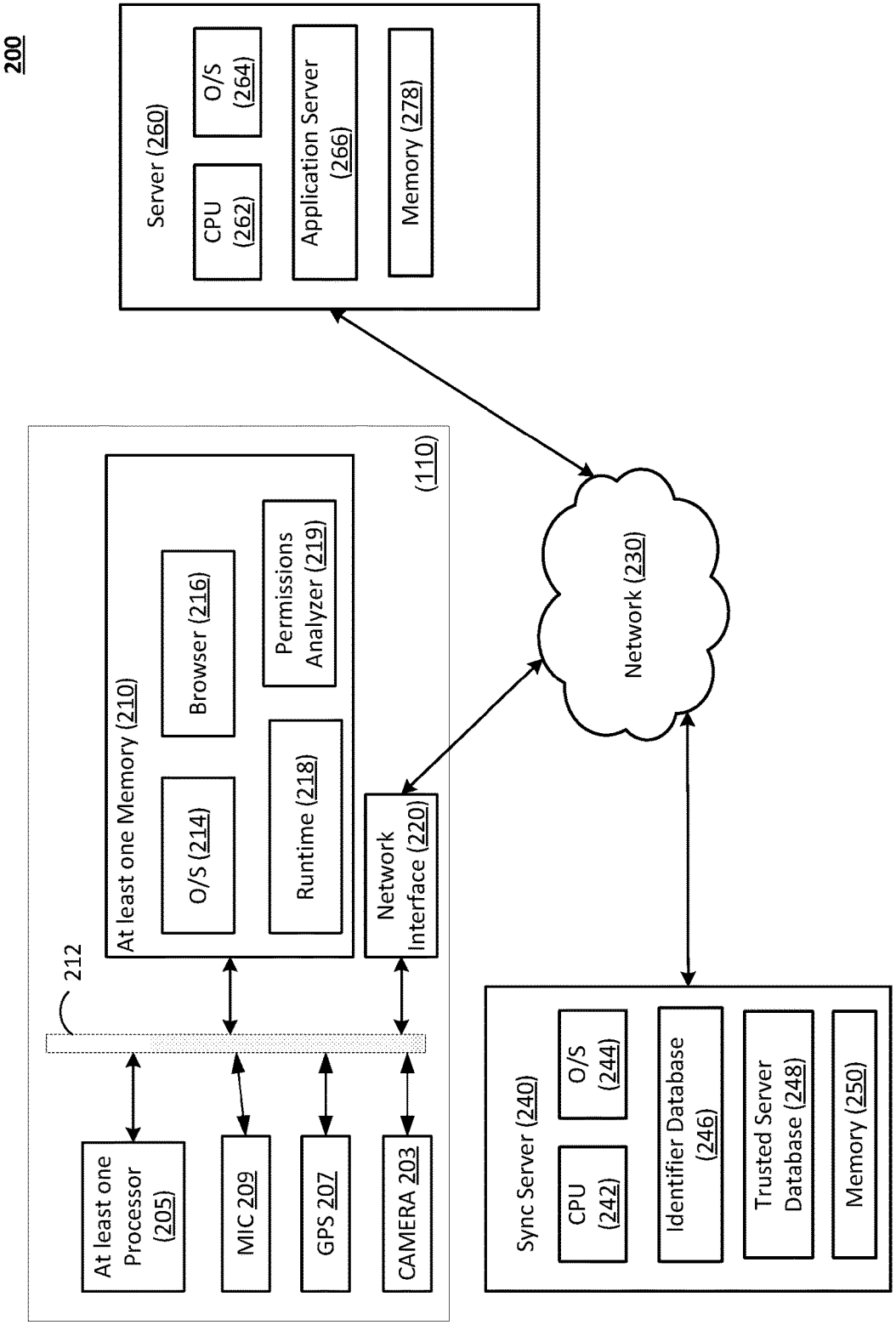
FIG. 2 is a block diagram of a system including a computing device, application server, a sync server, and a network.

FIG. 2 is a block diagram of a system 200 including a computing device 110 (e.g., computing devices 110A and/or 110B), application server 260 (which may provide marketplace 150 or application origin 180), a sync server 240, and a network 230. As shown in FIG. 2, the computing device 110 includes at least one processor 205 and at least one memory 210. The computing device 100 also includes hardware components, such as, for example, a camera 203, a GPS transceiver 207, and a microphone 209. The at least one processor 205, the hardware components, and the at least one memory 210 are communicatively coupled via bus 212. The computing device 110 may be, for example, an element of any computing device (e.g., personal computer, a laptop computer and the like). The server 260 can include one or more processors 262, one or more memories 278, an operating system (O/S) 264, an application server 266, and an applications datastore 272.

As shown in FIG. 2, at least one memory 210 includes code that can be executed to provide an operating system (O/S) 214, a browser 216, and a runtime 218. The operating system (O/S) 214, the browser 216, and the runtime 218 (together) may be configured to implement (at least a portion of) the methods described herein. The operating system 214 manages hardware resources associated with computing device 110 and provides common services for computer programs executing on computing device 110. The browser 216 implements the functions of a browser described in more detail above.

The runtime 218 can implement some behavior (e.g., low-level (e.g., core) and/or high-level (e.g., type checking, garbage collection and/or debugging)) of a computer language (e.g., HTML and/or JAVASCRIPT) or program (e.g., a web browser). Any computer language can implement some form of runtime, whether the language is a compiled language, interpreted language, embedded domain-specific language, or is invoked via an API. In some implementations, the runtime 218 can retrieve a background page, return details about a manifest, and listen for and respond to events in the application lifecycle. The runtime 218 can manage an application lifecycle. In this case, runtime 218 manages application installation, controls the event page, and can shut down the application at anytime.

As shown in FIG. 2 the system 200 can also include a sync server 240 that includes one or more processors 242, one or more memories 250, an operating system (O/S) 244, and an identifier database 246. The identifier database 246 can store unique identifiers to enable syncing between various user sessions on different client computing devices e.g., computing devices 110, 110A and/or 110B. For example, in some implementations, a user account allows a user to authenticate to system services (e.g., applications) and receive authorization to access them. To log into a user account, a user may authenticate herself with a password or other credentials for the purposes of accounting, security, and resource management. Once the user has logged on (e.g., to a web browser, to a computing device, etc.), an operating system may use an identifier to refer to the user, rather than a username. For example, the username may be correlated with a user identifier. A system (e.g., sync server 240) may reconcile and validate the proper ownership of user accounts, and can permanently link ownership of those user accounts to particular individuals by assigning a unique identifier to validated account login identifiers (e.g., user names and passwords, secure identifiers, etc.). The system may validate that individuals only have account login identifiers for the appropriate systems and applications, for example according to an organization's business policies, access control policies, and various application requirements.

In some implementations, when a user signs into a web browser or a certain device, all of the user's bookmarks, extensions, browser-executable applications, theme, other browser preferences and/or settings may be loaded from a sync server 240 via a network 230 and a network interface 220. Accordingly, the user's bookmarks, extensions, web applications, theme, other browser preferences and/or settings may be saved (e.g., in memory 250) and synced to a user's account (e.g., using identifier database 246). The user can then load these settings anytime the user signs into the web browser on other computers and devices. Changes to browser settings, for example, may be synced instantaneously to the account, and may be automatically reflected on other computers where the user has signed in (and enabled syncing).

Changes to settings on one computing device may be automatically copied (e.g., via sync server 240) from other computers (for example, if the user has enabled that sync feature). Synced data may be encrypted when it travels between computing devices to keep information secure. Further, passwords may be encrypted on computing devices using a cryptographic key. The sync server 240 may include a central service configured to hash settings that detects if suddenly a large number of devices request hashes for specific new settings and in this case refuse to provide hashes. The sync server 240 may include user submitted information about inconsistencies that are then used to build or improve a model to calculate confidence. The sync server 240 may report detections of inconsistencies to estimate the magnitude of infection rates.

Accordingly, information associated with browser settings (as well as the settings themselves) may be read from a file (e.g., XML file) or data store (e.g., database) downloaded (e.g., synchronized) from the sync server 240 and stored in memory 210. The identifier database 246 may access the file and/or data store in order to supplement and or generate the information about settings.

The application server 266 can serve applications from the application data store 272 to the client computing device 110. For example, an application can be served from the application data store 272 in response to a user input received at the client computing device 110, where the user input causes a signal to be sent from the client computing device 110 to the server 260 indicating that an ephemeral application should be downloaded from the server 260 to the computing device 110, and then launched on the computing device 110. The applications served from the data store 272 can include applications that are to be executed as ephemeral applications, and such applications can include information (e.g., within their manifests) that identifies them as ephemeral applications.

On the client computing device 110, a permissions analyzer 219 can parse the manifest of an application received from a server 260 to determine whether the application can be executed as an ephemeral application. In addition, the permissions analyzer 219 can determine the permissions that are requested by the ephemeral application. For example, the permissions analyzer 219 can parse the manifest of the application to determine the permissions that are requested by the ephemeral application.

The permissions analyzer 219 can compare the permissions requested by the ephemeral application to a list of permissions that are categorized by their relative safety for a user of the computing device 110 that executes an application, when the application is executed as an ephemeral application—i.e., when the application is installed and launched without any review and authorization of the permissions by a user. For example, in some implementations, permissions can be categorized as safe to utilize in an ephemeral application without any modification, safe to utilize in an ephemeral application only if modified such that the permission is not granted in its entirety, or unsafe to utilize in an ephemeral application unless the permission is explicitly granted by the user.

Once the permissions of an ephemeral application are determined, if the application includes a permission that is unsafe to utilize unless the permission is explicitly granted (e.g., a permission granting read/write access to a file system of the computing device), the application installation and launch process may be halted and an error message may be provided to the user to indicate that the application is unable to be launched in an ephemeral mode. In another implementation, if the application includes a permission that is unsafe to utilize unless the permission is explicitly granted, the user may be prompted to review and explicitly grant the permission before the installation and launch process of the application may continue.

If the application includes only permissions that are safe to utilize in an ephemeral application without any modification (e.g., a permission to prevent the client computing device 110 from entering a sleep mode while the application is executing, a permission that allows the application to determine whether a background data sync process is turned on or off, a permission that allows the application to determine whether the computing device is connected to the Internet through a Wi-Fi connection or through a mobile data network connection, a permission that allows the application to read content from a clipboard of the computing device, etc.), the ephemeral application may be installed and launched without any further input from the user after the user input that causes the ephemeral application to be downloaded from the server 260 to the client computing device 110.

In some implementations, an application launched in an ephemeral mode may request use of a permission that is deemed to be safe to utilize in an ephemeral application only when the permission a modified such that the permission is not granted in its entirety. For example, an application that requests use of unlimited storage space on the client computing device can be launched automatically without an additional user input after the input indicating that the application should be launched as an ephemeral application, but the request for use of unlimited storage space can be granted in a modified format, such that only a predetermined quota of storage space is allowed to be used by the application when executed in the ephemeral mode. In this manner, the application can be somewhat "tricked" into believing that the permission that it requested has been granted, when in fact the permission has been partially granted but has not been granted in its entirety. Therefore, the application can be launched in the ephemeral mode, without needing to request that the user explicitly approve the grant of storage space for use by the application, but the user is also protected by granting only a certain quota of storage space to the application when the application is executed in the ephemeral mode.

In another example, if the application that is being launched as an ephemeral application requests permission to receive location information about the client computing device 110, the permission can be granted silently (i.e., without explicit user permission) upon launch of the application, but the application may be informed that location information with GPS-level accuracy is unavailable from the device, even if the GPS transceiver 207 is active. Thus, coarse location information (e.g., based on the location of a mobile network tower or with which the device is communicating) can be provided to the application from the client computing device, so that the application can be launched and executed without requiring explicit user approval of the location permission, but high-accuracy location information (e.g., based on GPS signals available to the device) may be held back from the application, so that the privacy of a user of the computing device is protected.

This modification of a permission that is requested by the ephemeral application into a limited version of the permission that is actually granted can be managed by the runtime 218 that oversees the lifecycle of the ephemeral application. In some implementations, once the permissions analyzer 219 determines that the ephemeral application has requested a permission that will not be granted in its entirety while the application is executed in the ephemeral mode, a signal may be passed to the runtime 218, and, in response to the signal, the runtime 218 may be modified to provide a limited grant of the requested permission, which does not grant the requested permission in its entirety but that allows the launch and execution of the application to proceed without further input from the user after the user has requested the application from the server 260.

In some implementations, an application launched in an ephemeral mode may request use of a permission that is deemed to require explicit user authorization before the application can utilize the permission. However, rather than requesting authorization of the permission from the user when the application is installed, the application can be automatically installed and launched in response to a single user input to download and launch the application, but the prompt to the user to provide explicit authorization of the permission can be deferred until the application is running at a time when the application needs to utilize the specified permission. To do this, the runtime 218 can be modified to defer the prompt to the user to authorize the permission until the application is running and needs access to the permission, rather than prompting the user at the time the application is being installed to grant the permission.

For example, in one implementation, an ephemeral application (e.g., a telecommunication or videoconferencing application) may request access to a permission to receive audio signals from a microphone 209 of the computing device or may request access to a permission to receive images captured from the camera 203. A prompt to a user of the computing device 110 to grant these permissions can be deferred until the time during which the application is running and needs access to the audio signals from the microphone 209 or the images captured from the camera 203.

After an ephemeral application is launched and executed by a user of the computing device 110, the application can be closed by the user after the user is finished with the application. The ephemeral application can remain cached on the client computing device 110, so that the ephemeral application can be launched and used again, and so that the ephemeral application can be launched from the local device without having to download any code from a remote server. Because of this, the ephemeral applications can be used off-line, when the client computing device is not connected to a network of remote devices. Resources associated with the ephemeral application can be managed according to known cache eviction policies. For example, an ephemeral application can be stored in local resources of the client computing device and can remain stored until other newer applications require space that is occupied by the ephemeral application, at which point the ephemeral application can be deleted from the local resources of the client computing device or garbage collection can be performed on the local resources to attempt to reclaim space.

When a packaged application is installed and run in a non-ephemeral mode, the application can become idle after a period of time of inactivity or when the application is no longer front-facing in a user interface with the browser. The application may be placed in to a low-power "sleep" state when it is idle. The runtime can "wake up" an idle application to inform the application of various events, e.g. that the application has received a message from another application; that the application has received a push message from a server, an alarm (an event configured by the application) has fired, etc., and once the application has been woken up, the application can process the event. However, unlike an application run in a non-ephemeral mode, when an application is executed in an ephemeral mode, once all its UI windows have been closed, an ephemeral app will not receive these events or be woken up by the runtime. Rather, it will stay completely dormant in the cache and only will be activated by a user-initiated launch or the application. Because of this, the user experience of running an ephemeral application is that when the application is launched as and ephemeral application that the application is launched and executed only for as long as the user interacts with the application within a UI surface for the application, but that once the application is closed by the user it is completely closed.

Launching an application in an ephemeral mode, may allow a user to try out an application in a quick, light-weight manner before the user decides to fully install the application. An ephemeral application can be quickly promoted to a fully installed application since all its code and resources have already been downloaded to the client computing device, although not all of the application's permissions may have been granted when the application is launch in an ephemeral mode. In some implementations, to promote the application from ephemeral status to full status, a user interface can be provided (e.g., within the application itself, or within an application launcher) to prompt the user to explicitly approve the promotion of the application from ephemeral status to full status and the granting of any additional permissions needed by the application to operate in full status. Upon receiving the user's explicit approval, any additional permissions needed by the application may be granted, and the application may be allowed to operate in idle state from which it can be woken up to be informed of various events.

As shown in FIG. 2 the system 200 can also include a server 260 that includes one or more processors 262, one or more memories 278, an operating system (O/S) 264, an application server 266, and an applications datastore 272. In the example of FIG. 2, the computing device 110, server 260 and/or sync server 240 may be at least one computing system and should be understood to represent virtually any computing system configured to perform the techniques described herein. As such, the computing device 110, server 260 and/or sync server 240 may be understood to include various components which may be utilized to implement the techniques described herein, or different or future versions thereof. By way of example, the computing device 110, the server 260 and/or sync server 240 are illustrated as including the at least one processor 205, 242 and 262, respectively, as well as the at least one memory 210, 250 and 278 (e.g., a non-transitory computer readable storage medium) respectively.

Thus, as may be appreciated, at least one processor 205, 242 and/or 262 may be formed on a substrate and may be utilized to execute instructions stored on at least one memory 210, 250 and/or 278, so as to thereby implement the various features and functions described herein, or additional or alternative features and functions. Of course, at least one processor 205, 242 and/or 262 and at least one memory 210, 250 and/or 278 may be utilized for various other purposes. In particular, it may be appreciated that at least one memory 210, 250 and/or 278 may be understood to represent an example of various types of memory and related hardware and software which might be used to implement any one of the modules described herein. Systems and/or methods described above and/or below may include data and/or storage elements. The data and/or storage elements (e.g., data base tables) may be stored in, for example, at least one memory 210, 250 and/or 278.

Figure 3:
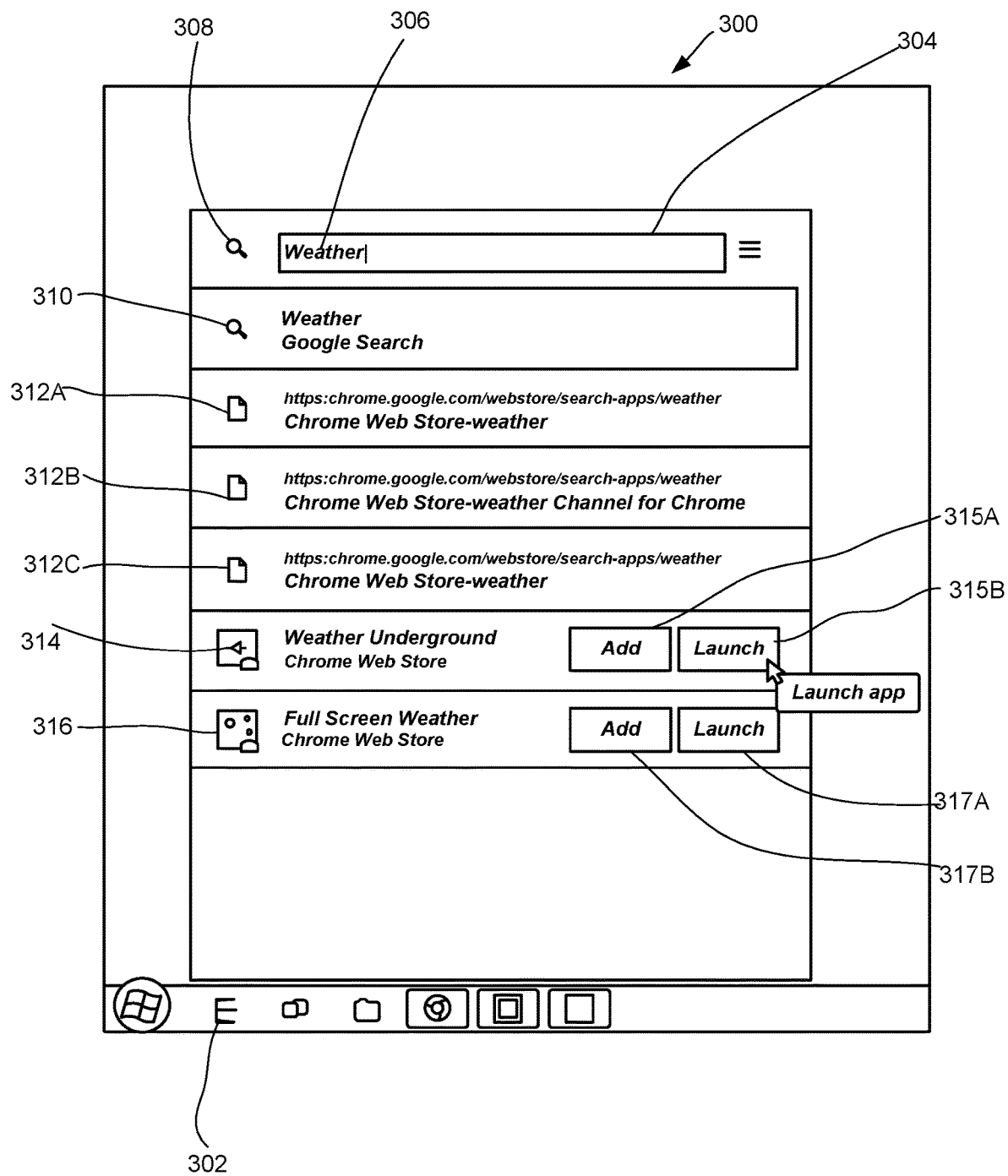
FIG. 3 is a schematic diagram of a user interface that is used to discover and launch one or more ephemeral applications.

FIG. 3 is a schematic diagram of a user interface 300 that is used to discover and launch one or more ephemeral applications. The user interface 300 can be provided in the form of an application launcher user interface 302 that is used to organize and display browser-executable applications that have been installed on the client computing device 110. The application launcher user interface 302 can include a search box 304 that can receive search query terms 306 entered by a user. Once a user has entered the desired search query terms in the search box 304, a user interface element 308 can be selected to perform a search for items responsive to the search query. For example, after selection of the user interface element 308, selection of a further user interface element 310 can perform a search for resources available on the Internet that are responsive to the search query. In another example, after selection of the user interface element 308, by selecting further user interface elements 312A, 312B, 312C a user can navigate to particular subdomains of the marketplace server 150 where additional searches for applications can be provided.

In a further implementation, after selection of the user interface element 308, user interface elements 314, 316 that refer to particular browser-executable applications that can be downloaded and secured it on the client computing device can be provided. In association with the user interface element 314 for a first browser-executable application responsive to the search query, a first user interface installation element 315A can be provided. Selection of the UI element 315A can cause the application associated with the UI element 314 to be downloaded from a remote server 260 to a client computing device 110, where the application is installed using a traditional installation procedure in which all of the permissions requested by the application are either silently granted or explicitly approved by the user at installation time, prior to launching and executing the application.

Also in association with the user interface element 314, a second user interface installation element 315B can be provided. Selection of the UI element 315B can cause the application associated with the UI element 314 to be downloaded from the remote server 260 to the client computing device 110, where the application is instantly launched in an ephemeral mode without requiring additional user input (e.g., to approve any permissions requested by the application). In association with the UI element 316 for a second browser-executable application, a first user interface installation element 317B and a second user interface installation element 317A can be provided, where the first UI installation element 317B provides a traditional installation procedure and the second UI installation element 317A provides an installation procedure that instantly launches the application in an ephemeral mode.

Figure 4:
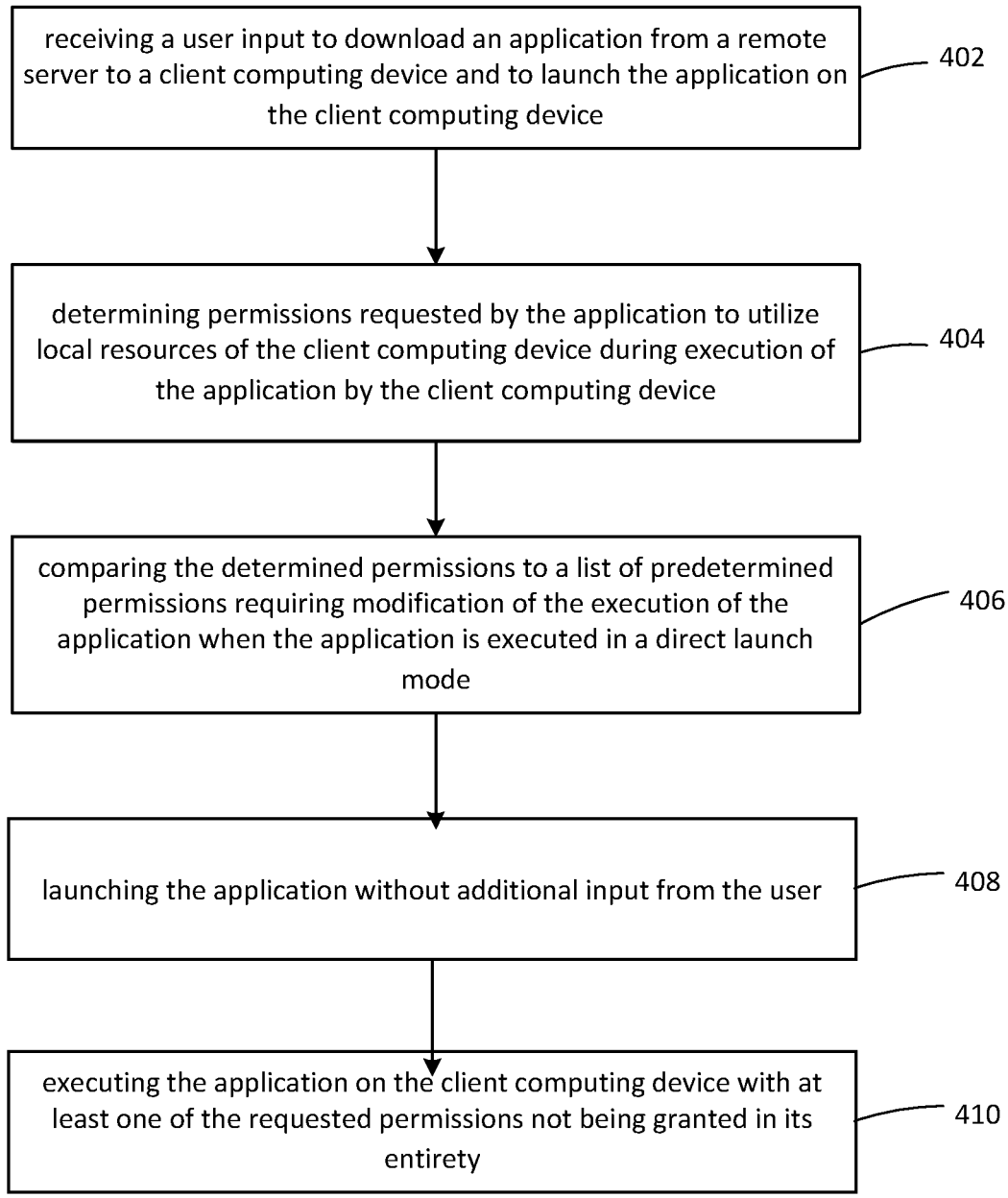
FIG. 4 is a flowchart of a method of executing an application in a direct launch mode.

FIG. 4 is a flowchart of a method 400 of executing an application in a direct launch mode. The method includes receiving a user input to download an application from a remote server to a client computing device and to launch the application on the client computing device (402). In some implementations, the application can be coded only with one or more web-technology programming languages, and the application can executable on the client computing device without compilation. In some implementations, the application contains all of the resources necessary to execute the application on the client computing device and code needed to execute the application by the client computing device is not dynamically generated.

The method 400 includes determining permissions requested by the application to utilize local resources of the client computing device during execution of the application by the client computing device (404). The determined permissions are compared to a list of predetermined permissions requiring modification of the execution of the application when the application is executed in a direct launch mode (406). The application is launched without additional input from the user (408), and the application is executed on the client computing device with at least one of the requested permissions not being granted in its entirety (410).

For example, executing the application with one of the requested permissions not being granted in its entirety includes modifying a runtime environment of the application, such that when the application is executed on the client computing device, the least one of the requested permissions is not granted in its entirety. In some implementations, at least one of the requested permissions not being granted in its entirety includes a permission to access unlimited storage space on the client computing device and wherein execution of the application includes executing the application on the client computing device while granting access to a predetermined maximum amount of storage space on the client computing device. In some implementations, the at least one of the requested permissions not being granted in its entirety includes a permission to access information about a location of the client computing device and wherein execution of the application includes executing the application on the client computing device while informing the application that location information with GPS-level accuracy is unavailable, even when a GPS transceiver of the client computing device is active.

Figure 5:
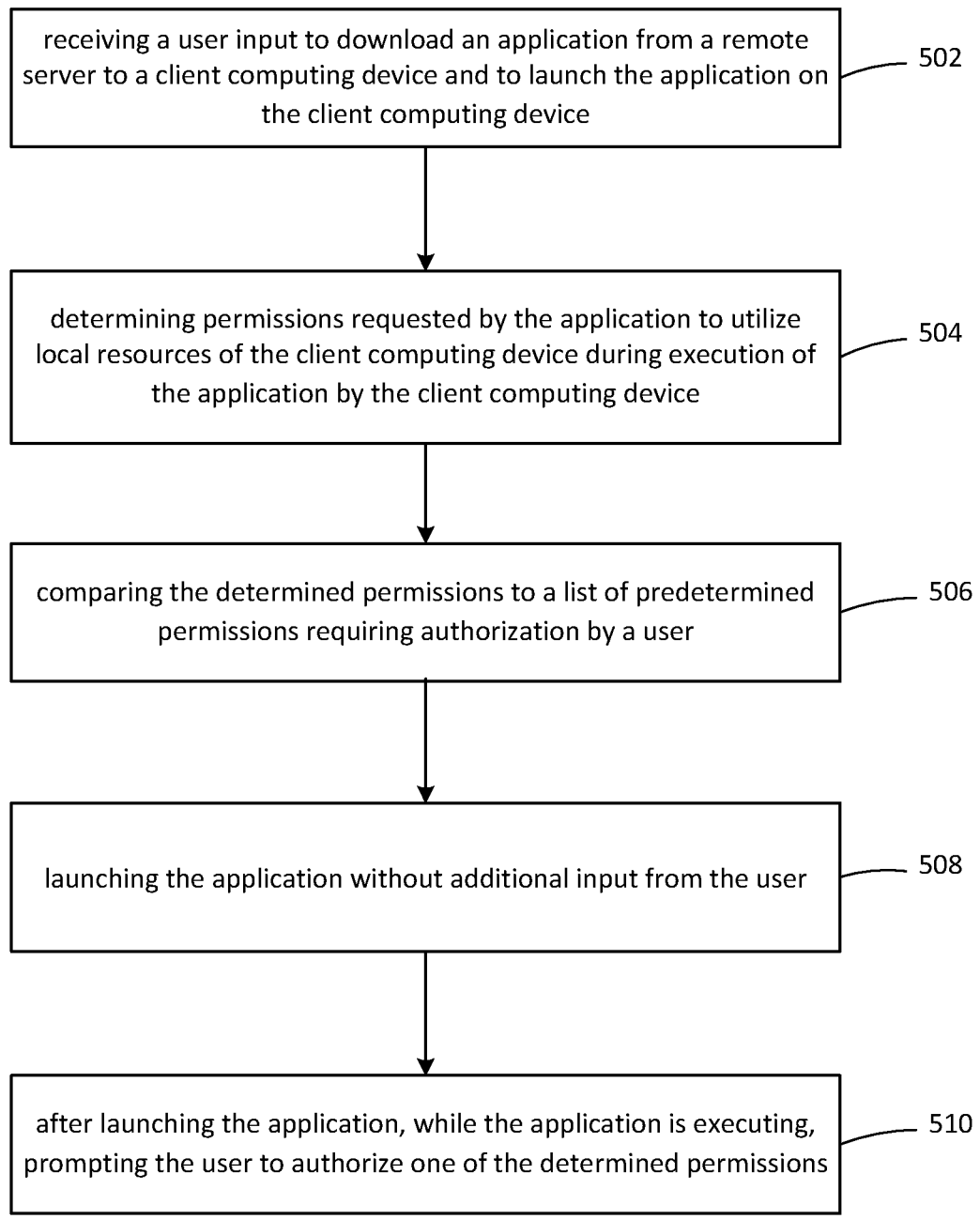
FIG. 5 is a flowchart of a method of executing an application in a direct launch mode according to at least one example embodiment.

FIG. 5 is a flowchart of a method 500 of executing an application in a direct launch mode according to at least one example embodiment. The method includes receiving a user input to download an application from a remote server to a client computing device and to launch the application on the client computing device (502). Permissions requested by the application to utilize local resources of the client computing device during execution of the application by the client computing device are determined. (504). The determined permissions are compared to a list of predetermined permissions requiring authorization by a user (506). The application is launched without additional input from the user (508), and, after launching the application, while the application is executing, the user is prompted to authorize one of the determined permissions (510). In some implementations, the prompting can occur at a time during the execution when the application needs to utilize the local resources permitted by the permission in order to continue executing.

In some implementations, prompting the user can include prompting the user to authorize a permission to access information about a location of the client computing device with GPS-level accuracy. In some implementations, prompting the user can include prompting the user to authorize is a permission to access unlimited storage space on the client computing device. In some implementations, prompting the user can include prompting the user to authorize is a permission to capture audio information from a microphone of the client computing device. In some implementations, the application can be coded only with one or more web-technology programming languages, and wherein the application is executable on the client computing device without compilation. In some implementations, the application can contain all of the resources necessary to execute the application on the client computing device and code needed to execute the application by the client computing device is not dynamically generated.

Figure 6:
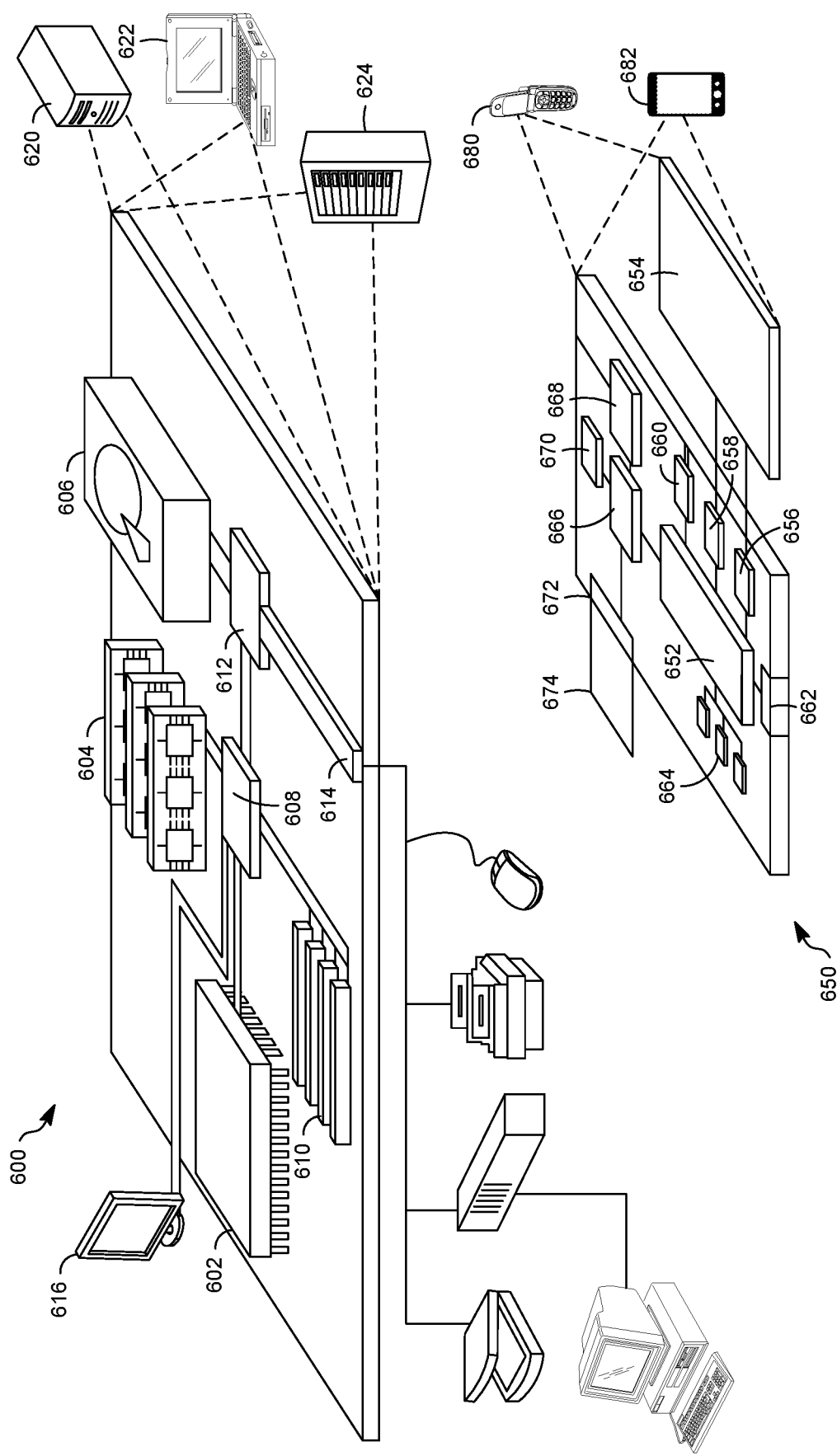
FIG. 6 shows an example of a generic computer device and a generic mobile computer device, which may be used with the techniques described here.

FIG. 6 shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may include appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, LTE, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium and/or a non-transitory computer-readable storage medium. A processor(s) (e.g., a processor formed on a silicon or GaAs substrate) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether that particular combination has been specifically enumerated in the accompanying claims at this time.

What is claimed is:

1. A method comprising:
presenting a user interface (UI) configured for user entry of a search query and for identifying an application as being responsive to the search query, the UI including a first UI element to be selected for installing the application in a non-direct launch mode, the non-direct launch mode involving transfer of the application to a client computing device and confirmation or granting of permissions by a user, and a second UI element to be selected for installing the application in a direct launch mode, the direct launch mode involving transfer of the application to the client computing device without confirmation or granting of permissions by the user;
receiving a first user input made using the second UI element to launch the application on the client computing device using the direct launch mode;
determining, after the transfer of the application to the client computing device, whether the application can be executed in the direct launch mode, the determination including:
determining permissions requested by the application to utilize local resources of the client computing device during execution of the application by the client computing device; and
comparing the determined permissions to a list of predetermined permissions available when the application is executed in the direct launch mode, the list of predetermined permissions being different than the permissions to execute the application in the non-direct launch mode; and
in response to determining that the application can be executed in the direct launch mode, executing the application in the direct launch mode on the client computing device.

2. The method of claim 1, further comprising:
receiving a second user input to promote the application to a fully-installed application; and
installing the application.

3. The method of claim 2, further comprising:
after installing the application, executing the application in the non-direct launch mode with different permissions than when the application executed in the direct launch mode.

4. The method of claim 1, wherein the executing the application in the non-direct launch mode with different permissions than when the application is executed in the direct launch mode includes executing the application with an additional permission to utilize local resources than when the application was executed in the direct launch mode.

5. The method of claim 1, wherein executing the application in the direct launch mode on the client computing device includes executing the application with at least one of the permissions requested by the application being partially granted.

6. The method of claim 5, wherein executing the application with one of the requested permissions being partially granted includes modifying a runtime environment of the application, such that when the application is executed in the direct launch mode on the client computing device, the at least one of the requested permissions is partially granted.

7. The method of claim 1, wherein the application contains all of the resources necessary to execute the application on the client computing device and wherein code needed to execute the application by the client computing device is not dynamically generated.

8. The method of claim 5, wherein the at least one of the requested permissions being partially granted includes a permission to access information about a location of the client computing device and wherein execution of the application includes executing the application on the client computing device while informing the application that location information with GPS-level accuracy is unavailable, even when a GPS transceiver of the client computing device is active.

9. A method comprising:
presenting a user interface (UI) including a first UI element to be selected for installing an application in a non-direct launch mode, the non-direct launch mode involving transfer of the application to a client computing device and confirmation or granting of permissions by a user, and a second UI element to be selected for installing the application in a direct launch mode, the direct launch mode involving transfer of the application to the client computing device without confirmation or granting of permissions by the user;
receiving a first user input made using the second UI element to launch the application on the client computing device using the direct launch mode;
determining, after the transfer of the application to the client computing device, whether the application can be executed in the direct launch mode;
in response to determining that the application can be executed in the direct launch mode, executing the application in the direct launch mode with a first set of permissions to utilize local resources of the client computing device;
receiving a second user input to promote the application to a fully-installed application;
installing the application; and
executing the application in a fully-installed mode with a second set of permissions to utilize local resources of the client computing device.

10. The method of claim 9, wherein the second set of permissions includes an additional permission than the first set of permissions.

11. The method of claim 9, wherein executing the application in the direct launch mode on the client computing device includes executing the application with at least one of the permissions requested by the application being partially granted.

12. The method of claim 11, wherein executing the application in the fully-installed mode includes executing the application with the at least one of the permissions requested by the application being fully granted.

13. The method of claim 11, wherein executing the application with one of the permissions requested by the application being partially granted includes modifying a runtime environment of the application, such that when the application is executed in the direct launch mode on the client computing device, the at least one of the permissions requested by the application is partially granted.

14. The method of claim 11, wherein the at least one of the permissions requested by the application being partially granted includes a permission to access information about a location of the client computing device and wherein execution of the application includes executing the application on the client computing device while informing the application that location information with GPS-level accuracy is unavailable, even when a GPS transceiver of the client computing device is active.

15. A system for executing an application, the system comprising:

memory storing executable instructions;

one or more processors coupled to the memory and configured to execute the instructions to cause the system to:

present a user interface (UI) configured for user entry of a search query and for identifying an application as being responsive to the search query, the UI including a first UI element to be selected for installing the application in a non-direct launch mode, the non-direct launch mode involving transfer of the application to a client computing device and confirmation or granting of permissions by a user, and a second UI element to be selected for installing the application in a direct launch mode, the direct launch mode involving transfer of the application to the client computing device without confirmation or granting of permissions by the user;

receive a first user input made using the second UI element to launch the application on the client computing device;

determine, after the transfer of the application to the client computing device, whether the application can be executed in the direct launch mode, the determination including:

determine permissions requested by the application to utilize local resources of the client computing device during execution of the application by the client computing device; and compare the determined permissions to a list of predetermined permissions available when the application is executed in the direct launch mode, the list of predetermined permissions being different than the permissions to execute the application in a non-direct launch mode; and in response to determining that the application can be executed in the direct launch mode, execute the application in the direct launch mode on the client computing device.

16. The system of claim 15, wherein the instructions further cause the system to:

receive a second user input to promote the application to a fully-installed application; and install the application.

17. The system of claim 16, wherein the instructions further cause the system to:

after installing the application, execute the application in the non-direct launch mode with different permissions than when the application executed in the direct launch mode.

18. The system of claim 17, wherein the instructions to execute the application in the non-direct launch mode with different permissions than when the application is executed in the direct launch mode includes instructions to execute the application with an additional permission to utilize local resources than when the application was executed in the direct launch mode.

19. The system of claim 17, wherein the instructions to execute the application in the direct launch mode on the client computing device includes instructions to execute the application with at least one of the permissions requested by the application being partially granted.

20. The system of claim 19, wherein the instructions to execute the application in the non-direct launch mode includes instructions to execute the application with the at least one of the permissions requested by the application being fully granted.

* * * * *